United States Patent [19]

Imai et al.

[11] Patent Number: 4,797,865
[45] Date of Patent: Jan. 10, 1989

[54] INFORMATION RECORDING DISC PLAYER HAVING RECEIVING PARTS FOR RECEIVING A PLURALITY OF DISC CARTRIDGES

[75] Inventors: Tooru Imai, Yamato; Kouichi Mutou, Chigasaki; Hidetoshi Yamazaki, Atsugi; Masae Murata, Yamato, all of Japan

[73] Assignee: Victor Company of Japan, Ltd., Kanagawa, Japan

[21] Appl. No.: 54,854

[22] Filed: May 26, 1987

[30] Foreign Application Priority Data

Jun. 2, 1986 [JP] Japan .................................. 61-84260

[51] Int. Cl.$^4$ ............................................. G11B 23/04
[52] U.S. Cl. ......................................... 369/39; 369/36
[58] Field of Search .............................. 369/36, 38, 39

[56] References Cited

U.S. PATENT DOCUMENTS 4,170,030 10/1979 Castrodale et al. ................... 369/38
4,682,313 7/1987 Miyake .................................. 369/291

FOREIGN PATENT DOCUMENTS 57-181476 11/1982 Japan .
58-826366 2/1983 Japan .
58-164058 9/1983 Japan .
58-164057 9/1983 Japan .

Primary Examiner—Steven L. Stephan
Attorney, Agent, or Firm—Ladas & Parry

[57] ABSTRACT

An information recording disc player comprises a first cartridge receiving part for receiving a first cartridge which can accommodate a plurality of discs, a second cartridge receiving part for receiving a second cartridge which can accommodate a single disc, and a disc playing unit for selectively playing an arbitrary one of the discs accommodated within the first and second cartridges respectively loaded into the first and second cartridge receiving parts.

8 Claims, 9 Drawing Sheets

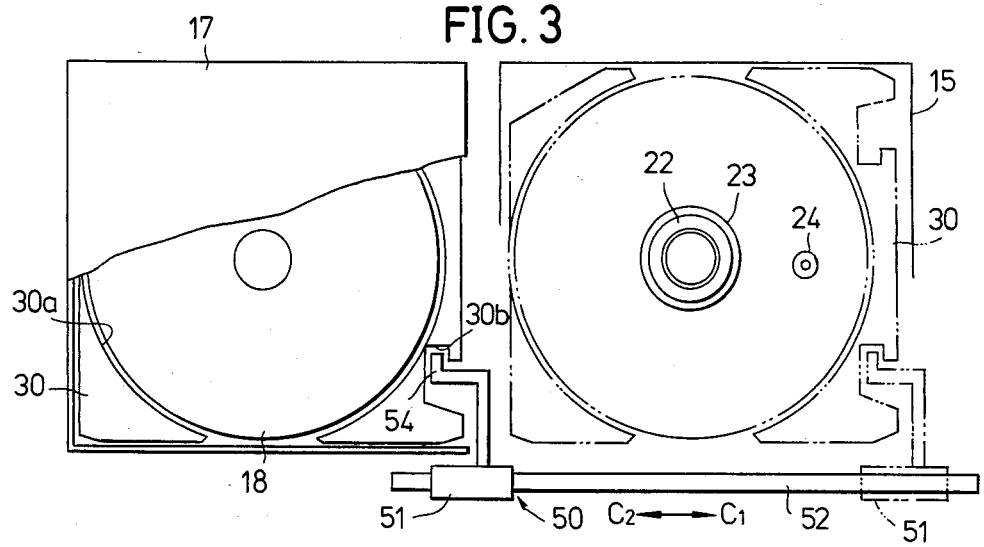
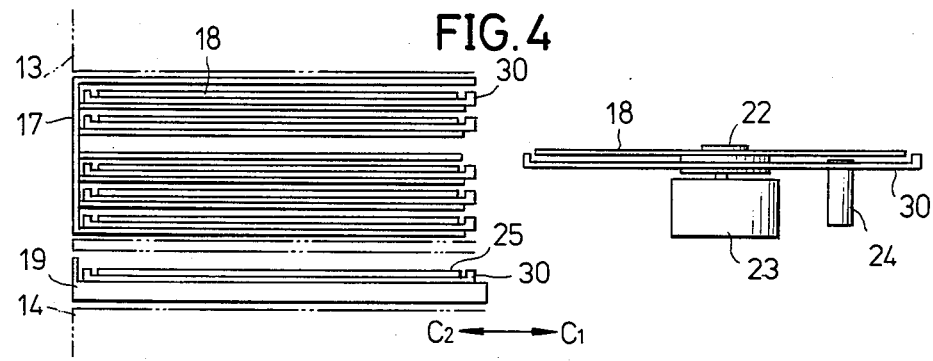
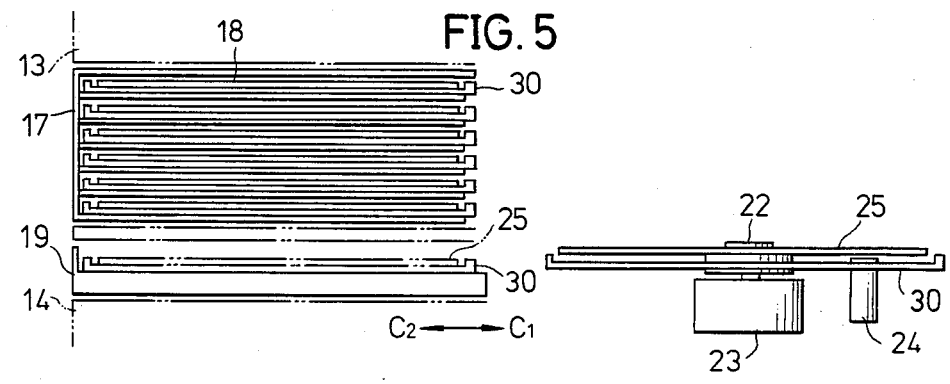

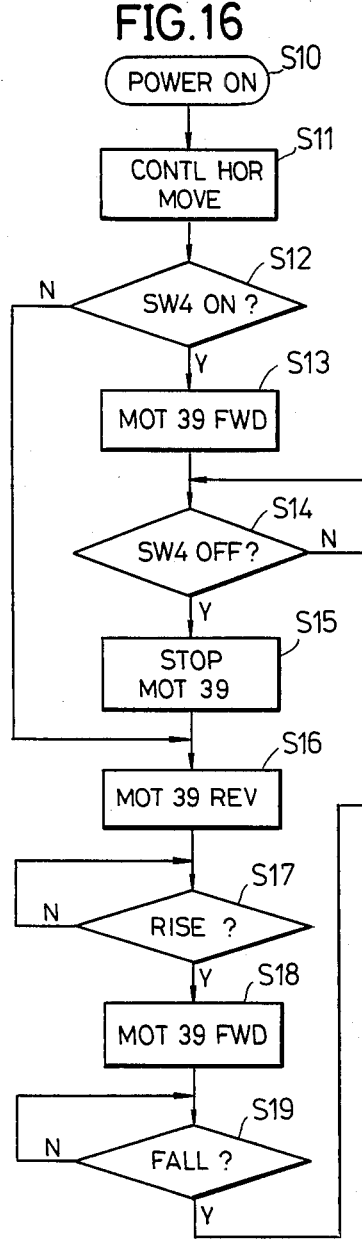
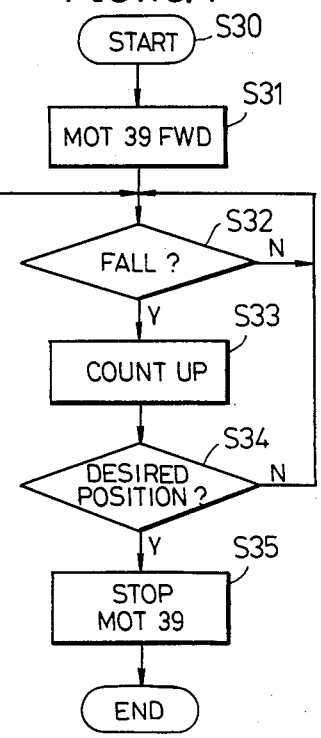
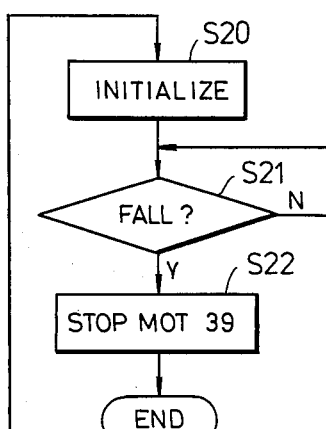
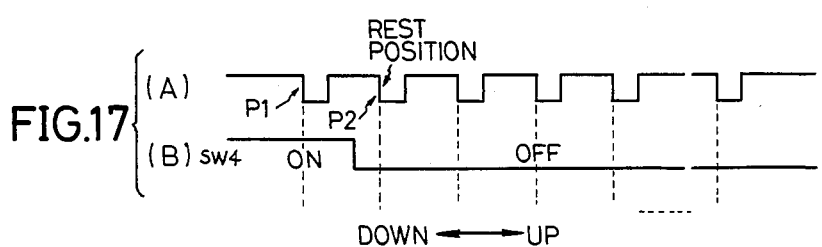

INFORMATION RECORDING DISC PLAYER HAVING RECEIVING PARTS FOR RECEIVING A PLURALITY OF DISC CARTRIDGES

BACKGROUND OF THE INVENTION

The present invention generally relates to information recording disc players, and more particularly to an information recording disc player for selectively playing one of a plurality of information recording discs loaded into the information recording disc player together with disc cartridges.

Conventionally, there is an information recording disc player (hereinafter simply referred to as a disc player) which is loaded with a disc cartridge accommodating a plurality of compact discs and selectively plays one of the compact discs in the cartridge at one time. According to this disc player, when a predetermined number of discs to be played in sequence are accommodated within the cartridge which is loaded into the disc player, there is no need to unload a disc from the disc player and then load another disc into the disc player every time the playing of one disc is completed because one of the discs in the cartridge may be selectively played in an arbitrary sequence. Hence, this disc player is especially useful when a user wishes to play a plurality of discs in sequence.

But there is a case where the user wishes to play a certain disc which is not accommodated within the cartridge which is already loaded in the disc player. In this case, the user must unload the cartridge from the disc player, extract one disc from the cartridge, insert the certain disc in place of the extracted disc, and then load the cartridge into the disc player so that the disc player may selectively play the certain disc. As a result, there is a problem in that the user must carry out an extremely troublesome operation when the certain disc which is to be played is not accommodated within the cartridge which is already loaded in the disc player.

Generally, the user accommodates within the cartridge discs which are of the same category such as classical music, for conveniencesake. Furthermore, the discs accommodated within the cartridge have something in common such as the performing artist. For these reason, when the certain disc is inserted into the cartridge in place of the extracted disc, it is desirable in most cases to replace the certain disc by the extracted disc after the certain disc is played. However, there is a problem in that the user must carry out a troublesome operation of unloading the cartridge from the disc player, extracting the certain disc from the cartridge, and then inserting the extracted disc to its original position within the cartridge in place of the extracted certain disc.

It is possible to prepare another cartridge which accommodates the certain disc in addition to the cartridge accommodating the plurality of discs. However, since the disc player is provided with only one cartridge receiving part, the originally loaded cartridge must be unloaded from the disc player before this other cartridge may be loaded into the disc player. As a result, although the operation is a little simpler compared to the case described above, the user must still carry out the troublesome operation of unloading the originally loaded cartridge from the disc player and then loading the other cartridge accommodating the certain disc into the disc player. In addition, when the user wishes to play one of the discs in the originally loaded cartridge after the playing of the certain disc is completed, the other cartridge must be unloaded from the disc player before the originally loaded cartridge can again be loaded into the disc player. Therefore, the preparation of the other cartridge accommodating the certain disc does not solve the problem of troublesome operations which must be carried out by the user when the user wishes to play the certain disc which is not accommodated within the originally loaded cartridge.

SUMMARY OF THE INVENTION

Accordingly, it is a general object of the present invention to provide a novel and useful disc player in which the problems described heretofore are eliminated.

Another and more specific object of the present invention is to provide a disc player comprising a first cartridge receiving part for receiving a first cartridge which can accommodate a plurality of discs, a second cartridge receiving part for receiving a second cartridge which can accommodate a single disc, and a disc playing unit for selectively playing an arbitrary one of the discs accommodated within the first and second cartridges respectively loaded into the first and second cartridge receiving parts. According to the disc player of the present invention, when a user wishes to play a certain disc which is not accommodated within the first cartridge which is already loaded in the first cartridge receiving part, it is possible to play the certain disc without unloading the first cartridge, by carrying out a simple operation of loading the second cartridge which accommodates the certain disc into the second cartridge receiving part. Hence, even in a case where the user is selectively playing the discs within the first cartridge but decides to play the certain disc which is not accommodated within the first cartridge, it is possible to play the certain disc within a short time by loading the second cartridge which accommodates the certain disc. In addition, the manufacturing cost of the disc player is not increased by a considerable amount since it is sufficient to provide one disc playing unit.

Still another object of the present invention is to provide a disc player in which the first and second cartridge receiving parts are arranged so that the discs accommodated within the first and second cartridges are arranged coaxially in the first and second cartridge receiving parts. According to the disc player of the present invention, the disc playing unit need only move along a single plane when moving to a position of a disc within the first or second cartridge, and mechanisms for moving the disc playing unit is simple.

A further object of the present invention is to provide a disc player in which the second cartridge is slidably provided on the second cartridge receiving part so that the certain disc may be inserted into the second cartridge in a disc receive/eject position and the disc playing unit may play the certain disc in a loaded position. According to the disc player of the present invention, the certain disc can be inserted into and extracted from the second cartridge with ease.

Another object of the present invention is to provide a disc player in which the second cartridge is detachably provided with respect to the second cartridge receiving part. According to the disc player of the present invention, it is possible to use different second cartridges accommodating different discs and load a desired second cartridge into the second cartridge receiving part when the user wishes to play a disc other than the discs within the first cartridge already loaded in the first cartridge receiving part.

Still another object of the present invention is to provide a disc player which further comprises a third cartridge receiving part for receiving another first cartridge. According to the present invention, it is possible to selectively play one of a large number discs at one time by loading the first cartridge into each of the first and third cartridge receiving parts.

Other objects and further features of the present invention will be apparent from the following detailed description when read in conjunction with the accompanying drawings.

BRIEF DESCRIPTION OF THE DRAWINGS

FIG. 3 is a plan view for explaining the extraction of a disc from a cartridge;

FIG. 4 is a side view for explaining the playing of a disc extracted from a first cartridge;

FIG. 5 is a side view for explaining the playing of a disc extracted from a second cartridge;

FIGS. 15 and 16 are flow charts for explaining first and second routines of the control part shown in FIG. 14, respectively;

FIGS. 17(A) and 17(B) are time charts for explaining the second routine;

FIGS. 18A and 18B are flow charts for explaining third and fourth routines of the control part, respectively.

DETAILED DESCRIPTION

Figure 1:
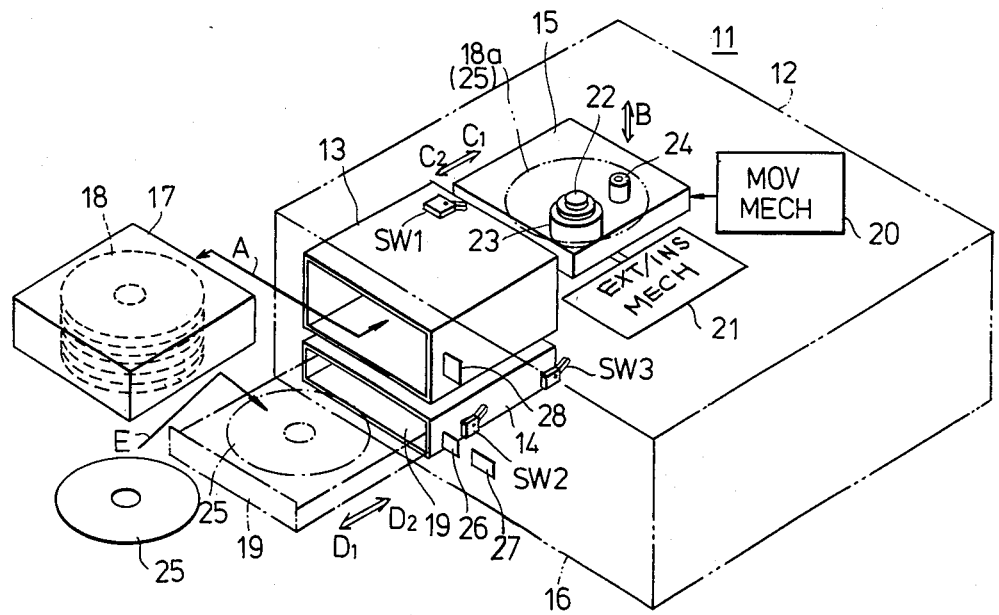
FIG. 1 is a perspective view showing a first embodiment of the disc player according to the present invention.

FIG. 1 shows a first embodiment of the disc player according to the present invention. A compact disc player 11 comprises a main player body 12 which is generally indicated by a two-dot chain line for convenience' sake. The main player body 12 comprises a first cartridge receiving part (hereinafter referred to as a first receiving part) 13 for receiving a first cartridge 17 which can accommodate a plurality of discs 18, a second cartridge receiving part (hereinafter referred to as a second receiving part) 14 for receiving a second cartridge 19 which can accommodate a single disc 25, a disc playing unit 15 and the like. The first and second receiving parts 13 and 14 are open at a front panel 16 of the main player body 12, and the first receiving part 13 is located above the second receiving part 14.

The first cartridge 17 accommodates six discs 18, for example. The discs 18 accommodated within the first cartridge 17 are arranged coaxially and approximately parallel to each other. The first cartridge 17 is loaded into the first receiving part 13 as indicated by an arrow A.

On the other hand, the second cartridge 19 only accommodates the disc 25. The second cartridge 19 is used according to the needs, and the second cartridge 19 is normally in the second receiving part 14 in an empty state. In the present embodiment, the second cartridge 19 is slidably provided in the second receiving part 14 and is non-detachable from the main player body 12. The second cartridge 19 may either take a disc receive/eject position indicated by a one-dot chain line or a loaded position indicated by a solid line in the second receiving part 14. The disc 25 may be set into and removed from the second cartridge 19 in the disc receive/eject position.

When a play operation is started by pushing a play button 27, the disc playing unit 15 is moved in a direction B by a moving mechanism 20 and is stopped at a predetermined position confronting the first receiving part 13 where a disc extraction/insertion mechanism 21 operates. The disc extraction/insertion mechanism 21 extracts a disc 18a out of the discs 18 accommodated within the first cartridge 17 in a direction C1 and places the extracted disc 18a on a turntable 22 of the disc playing unit 15. The turntable 22 is rotated by a motor 23, and pre-recorded signals are reproduced from the disc 18a by a pickup device 24. After the playing of the disc 18a is completed, the disc 18a is moved in a direction C2 by the disc extraction/insertion mechanism 21 and is returned to the original position within the first cartridge 17.

The discs 18 within the first cartridge 17 are played in an arbitrary sequence by repeating such a play operation.

When the user wishes to play the disc 25 which is different from the discs 18 and is not accommodated within the first cartridge 17 which is already loaded in the first receiving part 13, an eject button 26 is pushed so as to eject the second cartridge 19 in a direction D1 to the receive/eject position indicated by the one-dot chain line. The disc 25 is set into the second cartridge 19 as indicated by an arrow E, and the second cartridge 19 is pushed in a direction D2 to the loaded position within the second receiving part 14. Then, when the play button 27 is pushed, the disc playing unit 15 is moved in the direction B by the moving mechanism 20 and is stopped at a predetermined position confronting the second receiving part 14 where the disc extraction/insertion mechanism 21 operates. The disc extraction/insertion mechanism 21 extracts the disc 25 accommodated within the second cartridge 19 in the direction C1 and places the extracted disc 25 on the turntable 22 of the disc playing unit 15. The turntable 22 is rotated by the motor 23, and pre-recorded signals are reproduced from the disc 25 by the pickup device 24. After the playing of the disc 25 is completed, the disc 25 is moved in the direction C2 by the disc extraction/insertion mechanism 21 and is returned to the original position within the second cartridge 19.

Accordingly, it is unnecessary to unload the first cartridge 17 from the main player body 12 when playing the disc 25. Moreover, there is no need to interchange one of the discs 18 within the first cartridge 17 with the disc 25. In other words, the disc 25 may be played with the first cartridge 17 left loaded as it is within the first receiving part 13. Hence, the problems of the conventional disc player described before are eliminated. Further, since the second cartridge 19 is arranged in the form of a drawer, the disc 25 may be set into and removed from the second cartridge 19 with ease.

The first and second receiving parts 13 and 14 are arranged at predetermined positions of the main player body 12 so that the discs 18 accommodated within the first cartridge 17 and the disc 25 accommodated within the second cartridge 19 are arranged coaxially in the first and second receiving parts 13 and 14. Accordingly, the disc playing unit 15 need only move along a single plane (that is, in the direction B) when moving to a position of the disc within the first cartridge 17 or the second cartridge 19, and the mechanisms for moving the disc playing unit 15 is simple.

In FIG. 1, an eject button 28 is pushed when ejecting the first cartridge 17 out of the first receiving part 13.

Next, a description will be given on the mechanisms of the disc player 11 shown in FIG. 1, by referring to FIGS. 2 through 10. In FIGS. 2 through 10, those parts which are the same as those corresponding parts in FIG. 1 are designated by the same reference numerals.

As shown in FIGS. 3 through 5, six discs 18 are accommodated within the first cartridge 17 in a state where each disc 18 is placed within a depression 30a of a corresponding tray 30. Sides of each tray 30 are guided by guide parts provided on inner walls of the first cartridge 17, and the trays 30 are slidable in the directions C1 and C2. A cutout 30b is formed in each tray 30.

Similarly, the disc 25 is accommodated within the second cartridge 19 in a state where the disc 25 is placed within a depression 30a of a tray 30 which is identical to the trays 30 of the first cartridge 17. The tray 30 of the second cartridge 19 is also provided with a cutout 30b, and is slidable in the directions C1 and C2 under the guidance of guide parts provided on inner walls of the second cartridge 19.

Because the identical trays 30 are used in both the first and second cartridges 17 and 19, it is possible to use a common disc extraction/insertion mechanism 21 which will be described later for the extraction and insertion of the disc 18 from and into the first cartridge 17 and for the extraction and insertion of the disc 25 from and into the second cartridge 19. As a result, only a single disc extraction/insertion mechanism 21 is required and it is sufficient to provide only one disc playing unit 15.

Figure 2:
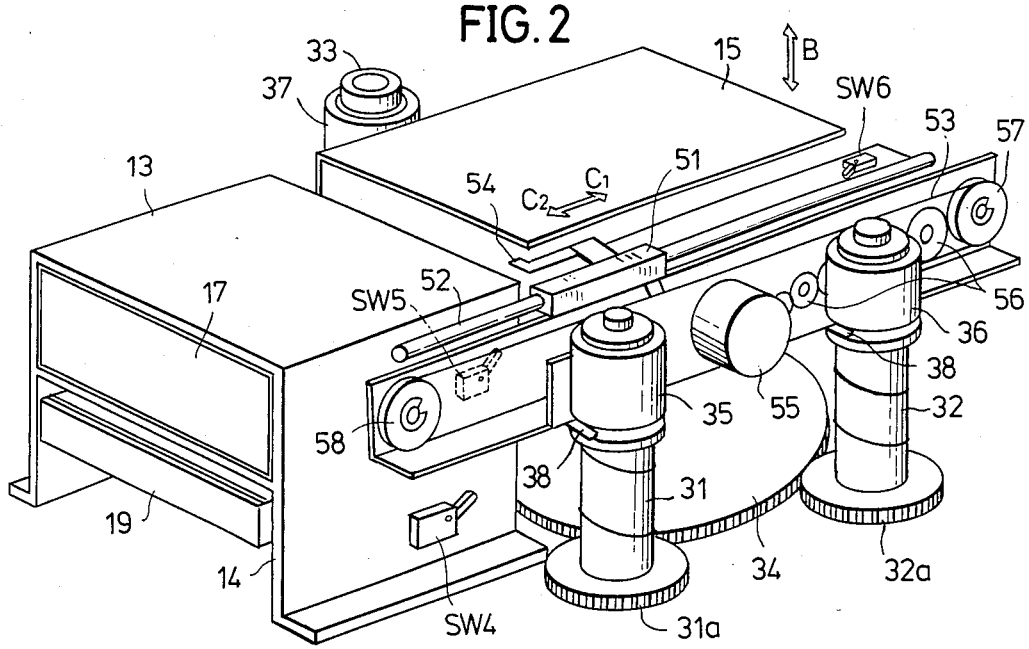
FIG. 2 is a perspective view showing a moving mechanism and a disc extraction/insertion mechanism of the disc player shown in FIG. 1.

FIG. 2 shows essential parts of the moving mechanism 20 and the disc extraction/insertion mechanism 21 of the disc player 11 shown in FIG. 1. In 0383 FIG. 2, lower gear portions 31a and 32a of threaded supports 31 and 32 and a lower gear portion (not shown) of a threaded support 33 respectively mesh with a large diameter gear 34. Nut members 35, 36 and 37 are respectively fitted on the threaded supports 31, 32 and 33. The disc playing unit 15 is supported in a horizontal position by arms 38 which engage the nut members 35, 36 and 37.

Figure 6:
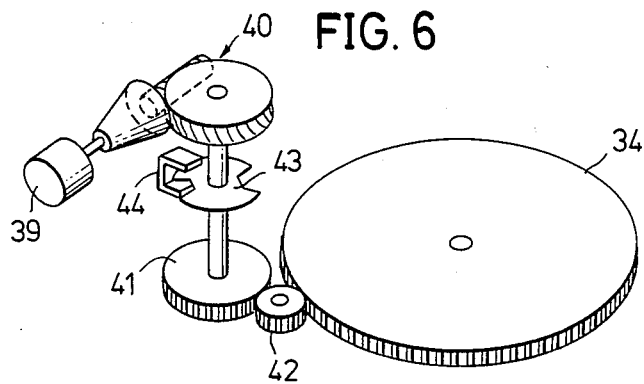
FIG. 6 is a perspective view showing a part of the moving mechanism.

First, a description will be given on the moving mechanism 20. FIG. 6 shows a part of the moving mechanism 20. When a motor 39 shown in FIG. 6 rotates, the large diameter gear 34 is rotated thereby via a worm gear mechanism 40 and gears 41 and 42. The threaded supports 31, 32 and 33 respectively rotate in the same direction at the same rotational speed responsive to the rotation of the large diameter gear 34, and the nut members 35, 36 and 37 move up or down in synchronism with the rotation of the threaded supports 31, 32 and 33. As a result, the disc playing unit 15 moves up or down in the direction B while maintaining the horizontal position and stops at a height position corresponding to the position of the disc 18 (or 25) which is to be played.

In FIG. 6, a rotary plate 43 having cutouts is fixed on a shaft which is mounted with the gear 41, and a photocoupler 44 is arranged as shown so that a light emitted from a light emitting diode (LED) of the photocoupler 44 is received by a photodetector of the photocoupler 44 via the cutout in the rotary plate 43. The photo-coupler 44 produces an output pulse every time the photodetector detects the light from the LED, and the position of the disc playing unit 15 can be detected with a high accuracy by counting the output pulses of the photo-coupler 44.

Next, a description will be given on the disc extraction/insertion mechanism 21. In FIGS. 2 and 3, a bracket 50 is fixed on a side surface of the disc playing unit 15 by screws, and a slider 51 is slidably fitted on a guide rod 52. The slider 51 is fixed to a wire belt 53. The slider 51 is provided with an engaging arm 54 which engages the cutout 30b of the tray 30.

When a motor 55 shown in FIG. 2 rotates in a forward direction in a state where the engaging arm 54 is engaged to the cutout 30b of the tray 30 as shown in FIG. 3, a pulley 57 is rotated via a reduction gear 56, and the wire belt 53 provided across the pulleys 57 and 58 is transported so as to move the slider 51 in the direction C1. As a result, the tray 30 is extracted from the first cartridge 17 together with the disc 18 as shown in FIGS. 3 and 4 and is placed on the turntable 22 of the disc playing unit 15.

After the playing of the disc 18 is completed, the motor 55 rotates in a reverse direction so as to move the slider 51 in the direction C2. Hence, the disc 18 is returned into the first cartridge 17 together with the tray 30 which supports the disc 18.

The extraction and insertion of the disc 25 from and to the second cartridge 19 is carried out similarly as in the case of the disc 18 accommodated within the first cartridge 17. FIG. 5 shows a state where the disc 25 is extracted from the second cartridge 19 together with the tray 30 which supports the disc 25.

Figure 9:
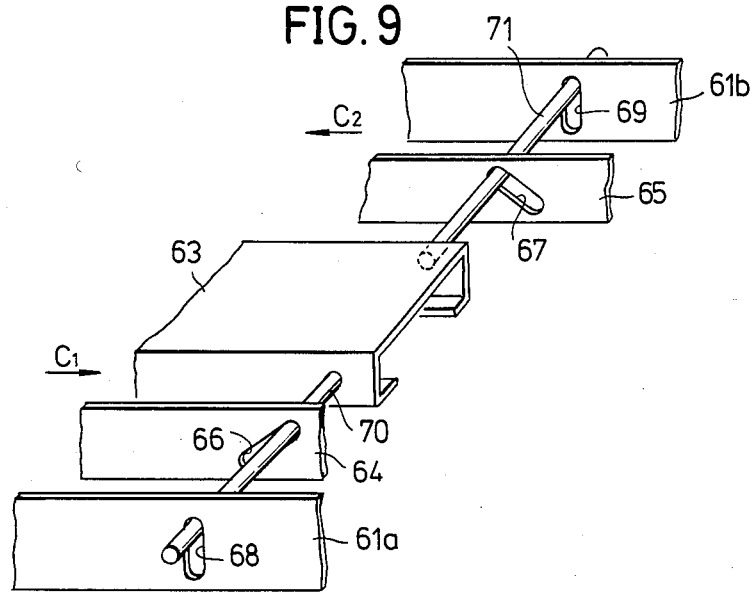
FIG. 9 is a perspective view showing a mechanism for raising and lowering a tray support frame shown in FIGS. 7 and 8.

Next, a description will be given on the disc playing unit 15 by referring to FIGS. 7 through 10. The motor 23 is mounted on a chassis 60, and the chassis 60 is supported on a frame 61 via rubber supports 62. As shown in FIG. 9, slide plates 64 and 65 have inclined grooves 66 and 67, respectively, where the inclined grooves 66 and 67 are inclined in mutually opposite directions. Vertical grooves 68 and 69 are formed in side walls 61a and 61b of the frame 61, respectively. A pin 70 provided on one side surface of a tray support frame 63 penetrates the grooves 66 and 68, and a pin 71 provided on the other side surface of the tray support frame 63 penetrates the grooves 67 and 69. Another pin 72 provided on the one side surface of the tray support frame 63 penetrates another inclined groove of the slide plate 64, and another pin 73 provided on the other side surface of the tray support frame 63 penetrates another inclined groove of the slide plate 65.

The tray support frame 63 takes a raised position moved in a direction F2 within the disc playing unit 15. The tray 30 is drawn into the tray support frame 63 together with the disc 18 (or 25).

Figure 7:
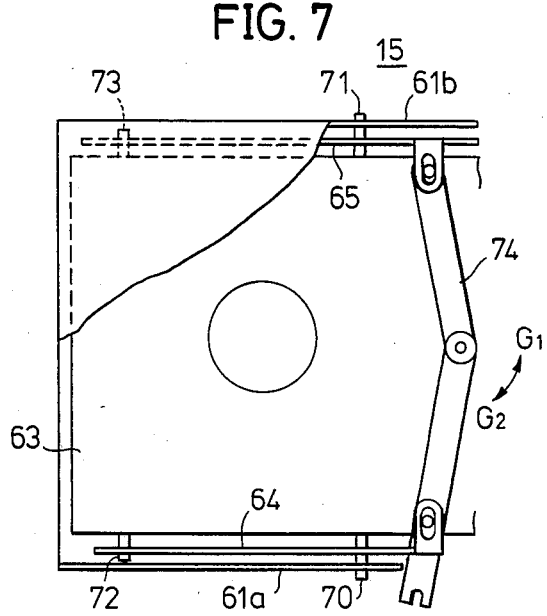
FIGS. 7 and 8 are a plan view with a part cut away and a side view respectively showing a disc playing unit.
Figure 8:
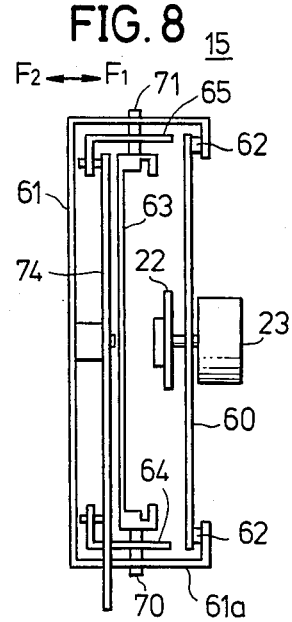
Figure 10:
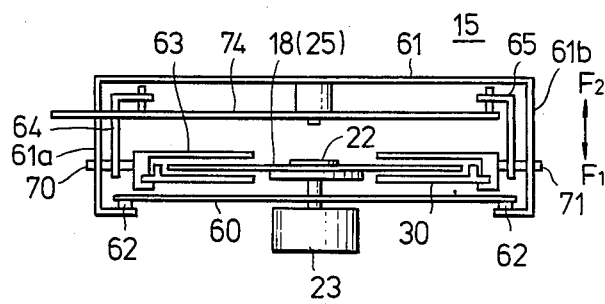
FIG. 10 is a cross sectional view showing the disc playing unit in a state where a disc is being played.

By the movement of the slider 51 after the tray 30 is drawn into the tray support frame 63, a lever 74 rotatably supported on the frame 61 rotates in a direction G1 in FIG.7. Accordingly, the slide plate 64 slides in the direction C1 while the slide plate 65 slides in the direction C2. In addition, the tray support frame 63 moves downwardly in a direction F1 by the guidance of the grooves 66, 67, 68, 69 and the like which guide the pins 70, 71, 73 and 73. Thus, as shown in FIGS.4, 5 and 10, the disc 18 (or 25) relatively floats from the tray 30 and is placed on the turntable 22 so that the pre-recorded signals are reproduced from the rotating disc 18 (or 25) by the pickup device 24.

After the playing of the disc 18 (or 25) is completed, the lever 74 rotates in a direction G2 and the tray support frame 63 moves upwardly in the direction F2 so that the disc 18 (or 25) is supported on the tray 30. In this state, the disc 18 (or 25) is returned within the first cartridge 17 (or second cartridge 19) together with the tray 30 by the disc extraction/insertion mechanism 21.

Figure 11:
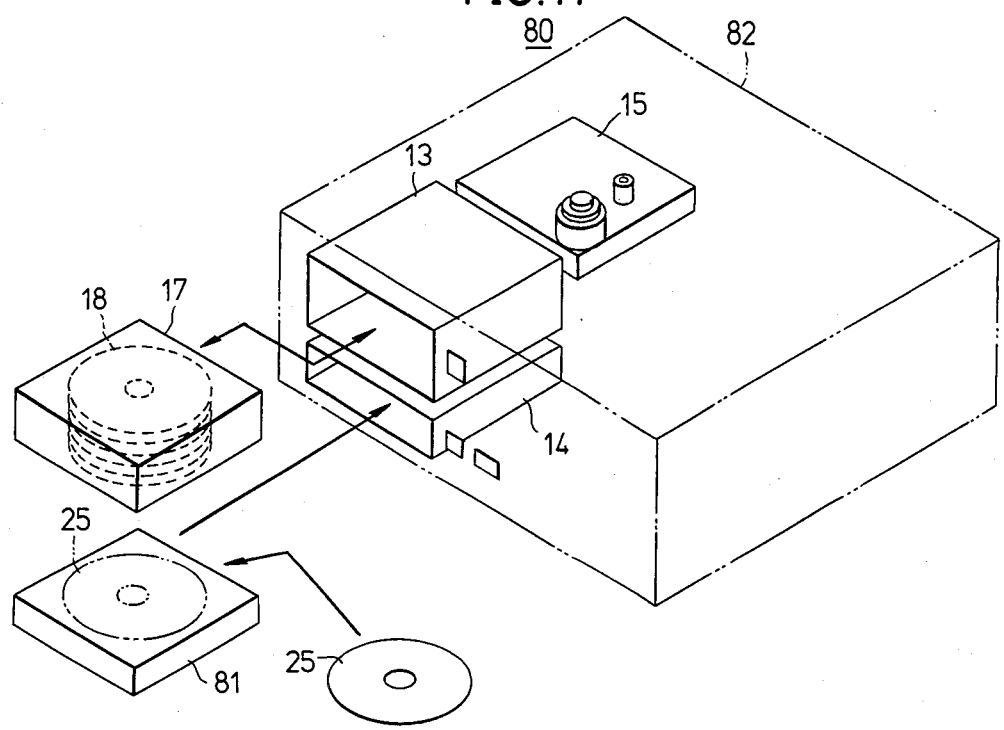
FIG. 11 is a perspective view generally showing a second embodiment of the disc player according to the present invention.
Figure 12:
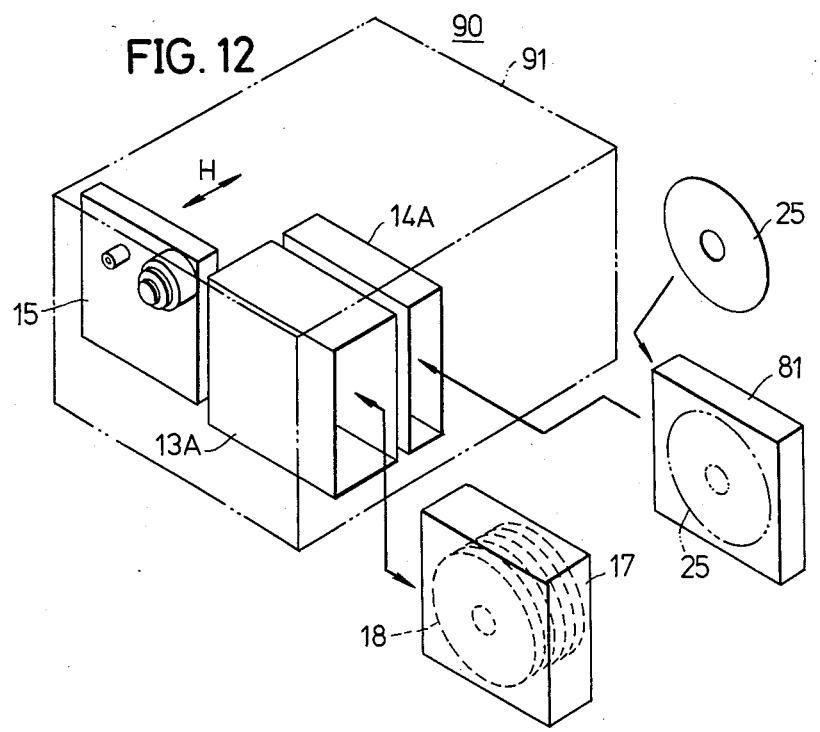
FIG. 12 is a perspective view generally showing a third embodiment of the disc player according to the present invention.
Figure 13:
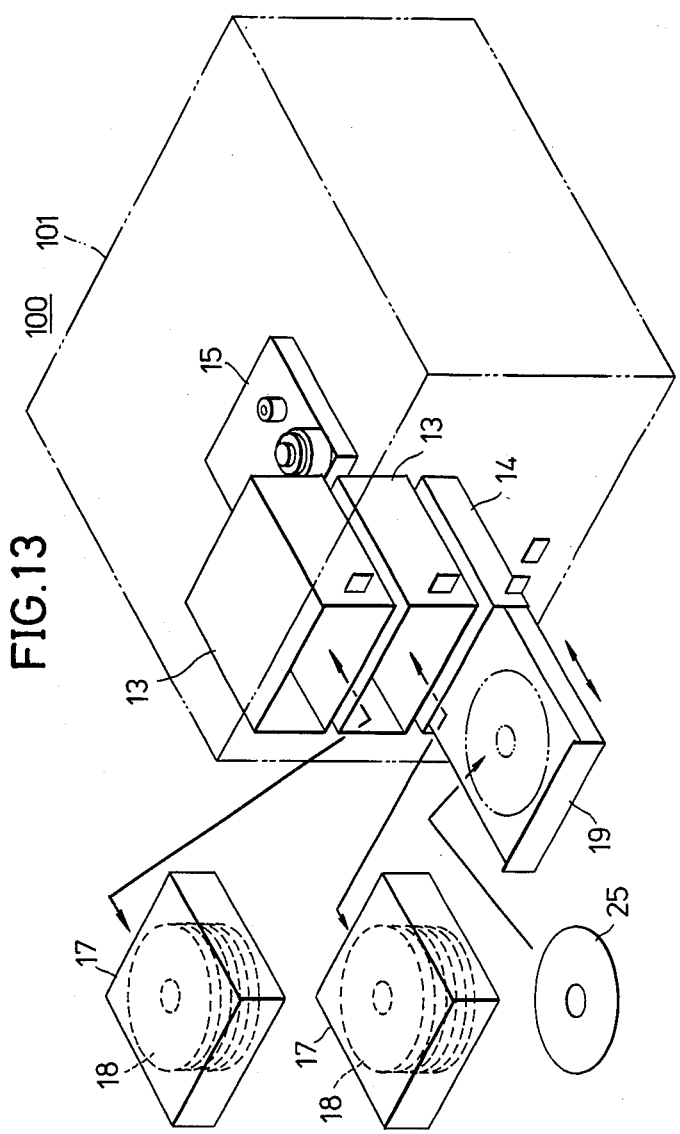
FIG. 13 is a perspective view generally showing a fourth embodiment of the disc player according to the present invention.

Next, a description will be given on second through fourth embodiments of the disc player according to the present invention, by referring to FIGS. 11 through 13. In FIGS. 11 through 13, those parts which are the same as those corresponding parts in FIG. 1 are designated by the same reference numerals, and a description thereof will be omitted.

FIG. 11 generally shows the second embodiment. A second cartridge 81 used in a compact disc player 80 is detachable from a main player part 82 of the disc player 80. When playing the disc 25 instead of one of the discs 18 within the first cartridge 17 which is already loaded in the first receiving part 13, the disc 25 is inserted into the second cartridge 81 and the second cartridge 81 is loaded into the second receiving part 14. According to the present embodiment, it is possible to use different second cartridges 81 accommodating different discs 25 and load a desired second cartridge 81 into the second receiving part 14 when the user wishes to play a disc 25 other than the discs 18 within the first cartridge 17 already loaded in the first receiving part 13.

FIG. 12 generally shows the third embodiment. In a compact disc player 90, first and second receiving parts 13A and 14A are arranged side by side in a main player body 91 as shown so that the discs 18 and 25 accommodated within the first and second cartridges 17 and 81 are arranged coaxially in the first and second receiving parts 13A and 14A. In the present embodiment, the disc playing unit 15 is arranged in accordance with the arrangement of the first and second receiving parts 13A and 14A and moves horizontally in a direction H. In other words, the discs 18 and 25 accommodated in the cartridges 17 and 19 in the receiving parts 13 and 14 are arranged coaxially along an imaginary line perpendicular to a horizontal bottom plate of the main player body in the first embodiment, but the discs 18 and 25 accommodated in the cartridges 17 and 81 in the receiving parts 13A and 14A are arranged coaxially along an imaginary line parallel to a horizontal bottom plate of the main player body 91 in this third embodiment.

FIG. 13 generally shows the fourth embodiment. In a compact disc player 100, the first receiving part 13 for receiving the first cartridge 17 is provided at two locations in a front panel of a main player body 101 of the disc player 100. According to the present embodiment, it is possible to selectively play one of a large number discs at one time by loading the first cartridge 17 into each of the two first cartridge receiving parts 13.

According to the second through fourth embodiments, it is also possible to obtain the same effects as those obtainable in the first embodiment. Further, it is possible to employ the drawer type second cartridge 19 instead of the second cartridge 81 in each of the second and third embodiments. Similarly, it is possible to employ the detachable type second cartridge 81 instead of the second cartridge 19 in each of the first and fourth embodiments.

Next, a description will be given on a control part of the disc player for controlling the operations of the disc player. In FIG. 1, a switch SW1 detects the ejection of the first cartridge 17, a switch SW2 detects the second cartridge 19 in the disc receive/eject position, and a switch SW3 detects the second cartridge 19 in the loaded position. In FIG. 2, a switch SW4 detects a reference position for determining the height position of the disc playing unit 15, a switch SW5 detects the slider 51 which returns the disc 18 (or 25) into the cartridge 17 (or 19), and a switch SW6 detects the slider 51 which extracts the disc 18 (or 25) from the cartridge 17 (or 19).

Figure 14:
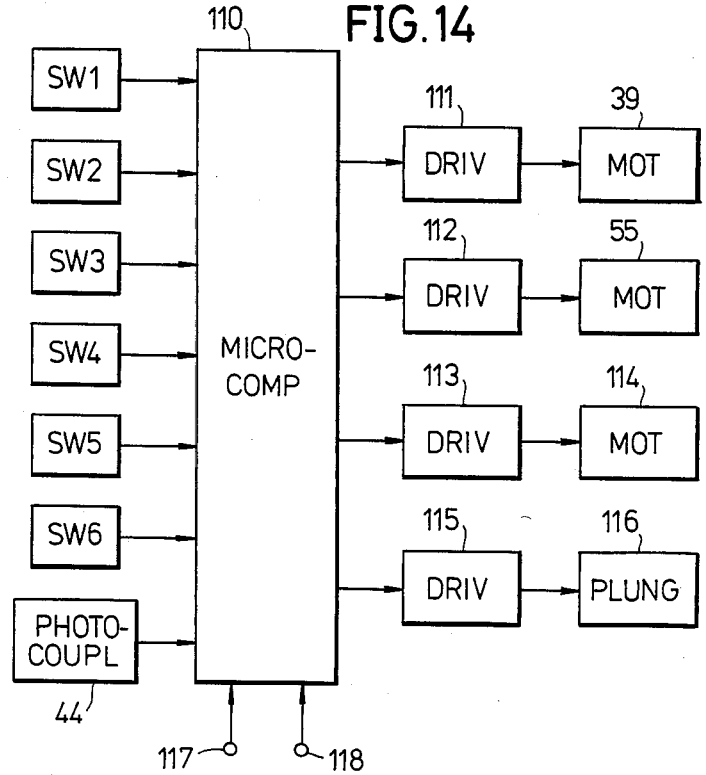
FIG. 14 is a system block diagram showing an embodiment of a control part for controlling the disc player of the present invention.

FIG. 14 shows an embodiment of the control part together with peripheral parts thereof. The control part is constituted by a microcomputer 110 which is supplied with output signals of the switches SW1 through SW6, the output pulse signal of the photo-coupler 44, an instruction signal from a terminal 117 designating a disc which is to be played, and an output detection signal of a sensor (not shown) provided in the disc playing unit 15 for detecting the existence and non-existence of a disc on the tray 30 which is loaded into the disc playing unit 15. The microcomputer 110 controls driving circuits 111, 112, 113 and 115 responsive to the incoming signals. The driving circuits 111 and 112 drive the motors 39 and 55, respectively. The driving circuit 113 drives a motor 114 for moving the second cartridge 19 between the disc receive/eject position and the loaded position. The driving circuit 115 drives a plunger 116 which is used to eject the first cartridge 17 from the first receiving part 13. In FIG. 1, the illustration of the motor 114 and the plunger 116 are omitted for convenience' sake.

Figure 15:
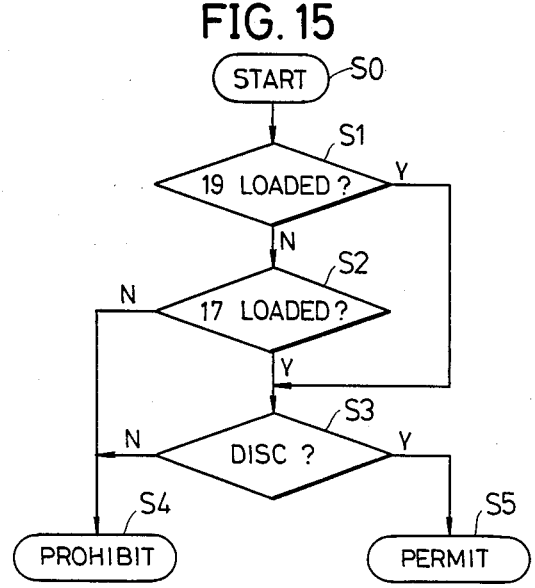

FIG. 15 shows a flow chart for explaining first routine of the microcomputer 110 for determining whether or not the operation mode of the disc player 11 can be set to a play mode. When the first routine is started in a step S0 in FIG. 15, a step S1 discriminates whether or not the second cartridge 19 is loaded in the second receiving part 14. When the switch SW3 is OFF, the step S1 discriminates that the second cartridge 19 is not loaded in the loaded position inside the second receiving part 14 and is at the disc receive/eject position or on the way thereto. On the other hand, the step S1 discriminates that the second cartridge 19 is loaded in the loaded position inside the second receiving part 14 when the switch SW3 is ON. The operation advances to a step S2 when the discrimination result in the step S1 is NO but advances to a step S3 when the discrimination result in the step S1 is YES.

The step S2 discriminates whether or not the first cartridge 17 is loaded in the first receiving part 13. When the switch SW1 is OFF, the step S2 discriminates that the first cartridge 17 is not loaded in the first receiving part 13. On the other hand, the step S2 discriminates that the first cartridge 17 is loaded in the first receiving part 13 when the switch SW1 is ON. The operation advances to the step S3 when the discrimination result in the step S2 is YES but advances to a step S4 when the discrimination result in the step S2 is NO.

The step S3 discriminates whether or not the disc 18 (or 25) designated by the instruction signal from the terminal 117 exists on the tray 30 which is loaded into the disc playing unit 15 responsive to the instruction signal. When no disc exists on the tray 30 on the disc playing unit 15, the discrimination result in the step S3 is NO and the step S4 prohibits the operation mode of the disc player 11 from being set to the play mode. But when the designated disc 18 (or 25) exists on the tray 30 on the disc playing unit 15 and the discrimination result in the step S3 is YES, a step S5 permits the operation mode of the disc player 11 to be set to the play mode. The existence and non-existence of a disc on the tray 30 which is on the playing unit 15 is detected by the sensor (not shown) in the disc playing unit 15, and the step S3 carries out the discrimination based on the output detection signal of the sensor. In the present embodiment, the operation mode of the disc player 11 cannot be set to the play mode unless both the first and second cartridges 17 and 19 are loaded into the respective first and second receiving parts 13 and 14, however, it is evident that modifications may be made so that the operation mode of the disc player 11 can be set to the play mode when at least one of the first and second cartridges 17 and 19 is in the loaded position. It is not essential that the second cartridge 19 contain the disc 25 when playing one of the discs 18 in the first cartridge 17.

FIG. 16 shows a flow chart for explaining a second routine of the microcomputer 110 for automatically moving the disc playing unit 15 to a rest position when a power to the disc player 11 is turned ON. When the disc playing unit 15 confronts the tray 30 of either one of the loaded first and second cartridges 17 and 19, the engaging arm 54 prevents the first or second cartridge from being unloaded from the corresponding receiving part. For this reason, it is desirable that the disc playing unit 15 is at the rest position where the disc playing unit 15 does not confront the first nor second cartridge while the disc player 11 is in a standby mode. In the case of the first embodiment, the rest position may be located at a height position above the first receiving part 13, between the first and second receiving parts 13 and 14, or below the second receiving part 14.

When the disc playing unit 15 moves vertically in the direction B, it is desirable that the engaging arm 54 is not in contact with the tray 30. For this reason, when the second routine is started in a step S10 in FIG. 16, a step S11 controls the horizontal movement of the disc playing unit 15 to ensure non-contact between the engaging arm 54 and the tray 30. The details of the step S11 will be described later.

A step S12 discriminates whether or not the switch SW4 is ON. The switch SW4 is ON when the disc playing unit 15 is below a rest position as shown in FIG. 17(B). When the discrimination result in the step S12 is YES, a step S13 rotates the motor 39 in a forward direction so as to raise the disc playing unit 15, and a step S14 discriminates whether or not the switch SW4 is OFF. When the discrimination result in the step S14 becomes YES, a step S15 stops the motor 39. After the step S15 or when the discrimination result in the step S12 is NO, a step S16 rotates the motor 39 in a reverse direction so as to lower the disc playing unit 15, and a step S17 discriminates whether or not a rising edge is detected in the output pulse signal of the photo-coupler 44. The output pulse signal of the photo-coupler 44 is shown in FIG. 17(A), and in FIG. 17(A), the edges of the pulse signal are detected toward the left when the disc playing unit 15 is moving downwardly and are detected toward the right when the disc playing unit 15 is moving upwardly. Hence, the step S17 discriminates whether or not the (rising) edge at a position P1 shown in FIG. 17(A) is detected in the pulse signal during the downward movement of the disc playing unit 15.

When the discrimination result in the step S17 becomes YES, a step S18 rotates the motor 39 in the forward direction so as to raise the disc playing unit 15. A step S19 then discriminates whether or not a falling edge is detected in the output pulse signal of the photocoupler 44. In other words, the step S19 discriminates whether or not the (falling) edge at the position P1 shown in FIG. 17(A) is detected in the pulse signal during the upward movement of the disc playing unit 15. When the discrimination result in the step S19 becomes YES, a step S20 initializes a counted value of the output pulse signal of the photo-coupler 44, and a step S21 discriminates whether or not a falling edge is detected in the output pulse signal of the photo-coupler 44. The counted value is initialized in the step S20 so that the disc playing unit 15 can be moved to a desired height position to extract a disc with reference to the rest position which is used as a reference position. The step S21 discriminates whether or not the (falling) edge at a position P2 shown in FIG. 17(A) is detected in the pulse signal during the upward movement of the disc playing unit 15. A step S22 stops the motor 39 when the discrimination result in the step S21 becomes YES, and the operation is ended.

In the present embodiment, the height position of the disc playing unit 15 is detected based on an absolute address information obtained from the output signal of the switch SW4 and a relative address information obtained from the output pulse signal of the photo-coupler 44. Furthermore, in the present embodiment, the disc playing unit 15 is always stopped during the upward movement thereof, so that the disc playing unit 15 is always stopped under the same conditions and the positioning accuracy is constant.

Figure 18B:
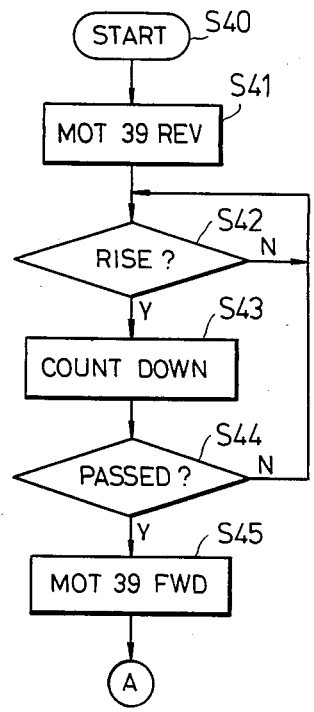

FIG. 18A shows a flow chart for explaining a third routine carried out by the microcomputer 110 for controlling the upward movement of the disc playing unit 15, and FIG. 18B shows a flow chart for explaining a fourth routine carried out by the microcomputer 110 for controlling the downward movement of the disc playing unit 15. As may be seen from FIGS. 18A and 18B, the third and fourth routines are carried out so that the disc playing unit 15 is always stopped during the upward movement thereof.

When the third routine is started in a step S30 in FIG. 18A, a step S31 rotates the motor 39 in the forward direction so as to raise the disc playing unit 15. A step S32 discriminates whether or not a falling edge of the output pulse signal of the photo-coupler 44 is detected. When the discrimination result in the step S32 becomes YES, a step S33 counts up the pulses of the pulse signal starting from the initialized counted value. A step S34 discriminates whether or not the disc playing unit 15 has reached a height position for extracting the desired disc from the cartridge, based on the instruction signal from the terminal 117 and the counted value. When the discrimination result in the step S34 is NO, the operation is returned to the step S32. On the other hand, a step S35 stops the motor 39 when the discrimination result in the step S34 is YES, and the operation is ended.

When the fourth routine is started in a step S40 in FIG. 18B, a step S41 rotates the motor 39 in the reverse direction so as to lower the disc playing unit 15. A step S42 discriminates whether or not a rising edge of the output pulse signal of the photo-coupler 44 is detected. When the discrimination result in the step S42 becomes YES, a step S43 counts down the pulses of the pulse signal starting from the initialized counted value. A step S44 discriminates whether or not the disc playing unit 15 has passed a height position for extracting the desired disc from the cartridge, based on the instruction signal from the terminal 117 and the counted value. When the dicrimination result in the step S44 is NO, the operation is returned to the step S42. On the other hand, a step S45 rotates the motor 39 in the forward direction when the discrimination result in the step S44 is YES, and the operation advances to the step S32 shown in FIG. 18A. As a result, the disc playing unit 15 is stopped during the upward movement thereof.

Next, a description will be given on the operation of the microcomputer 110 for moving the disc playing unit 15 horizontally. When the disc playing unit 15 moves in the direction C2 and returns the disc into the cartridge together with the tray 30, a leading edge of the engaging arm 54 in the moving direction C2 is in contact with the edge of the tray 30. But in order to avoid contact between the engaging arm 54 and the tray 30 when the disc playing unit 15 moves vertically, the disc playing unit 15 is moved back a short distance in the direction C1 after the disc is returned within the cartridge. There is no contact between the engaging arm 54 and the tray 30 at the position where the disc playing unit 15 is moved back the short distance. The switch SW5 is turned ON only when the disc playing unit 15 has passed this position in the direction C2 and the disc 18 (or 25) and the tray 30 are returned to the cartridge 17 (or 19), and is thereafter turned OFF when the disc playing unit 15 passes this position in the direction C1.

Figure 19A:
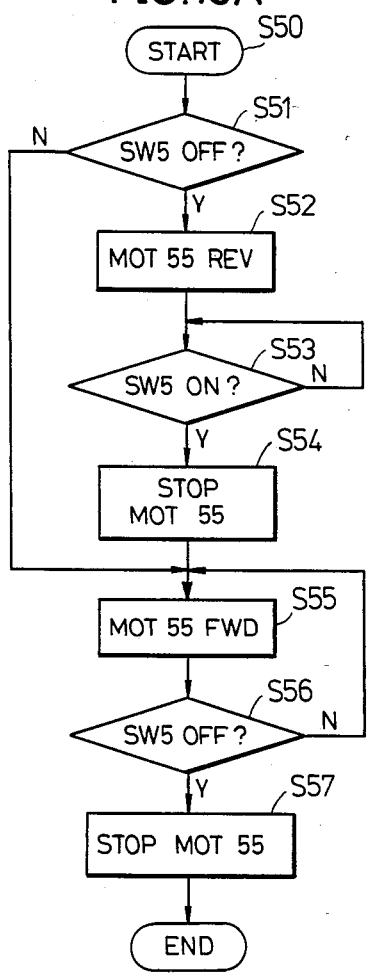
FIGS. 19A and 19B are flow charts for explaining fifth and sixth routines of the control part, respectively.
Figure 19B:
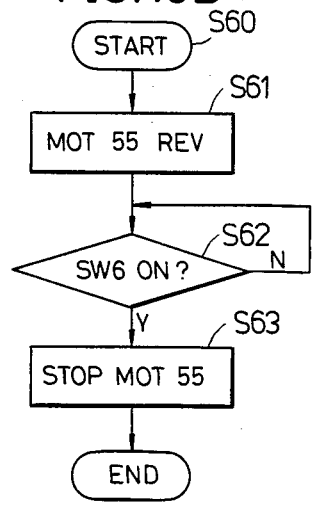

FIG. 19A shows a flow chart for explaining a fifth routine carried out by the microcomputer 110 for controlling the horizontal movement of the disc playing unit 15 in the direction C2, and FIG. 19B shows a flow chart for explaining a sixth routine carried out by the microcomputer 110 for controlling the horizontal movement of the disc playing unit 15 in the direction C1.

When the fifth routine is started in a step S50 in FIG. 19A, a step S51 discriminates whether or not the switch SW5 is OFF. When the discrimination result in the step S52 is YES, a step S52 rotates the motor 55 in the reverse direction so as to move the slider 51 in the direction C2. A step S53 discriminates whether or not the switch SW5 is ON. When the discrimination result in the step S53 becomes YES, a step S54 stops the motor 55. After the step S54 or when the discrimination result in the step S51 is NO, a step S55 rotates the motor 55 in the forward direction so as to move the slider 51 in the direction C1. Then, a step S56 discriminates whether or not the switch SW5 is OFF. The operation is returned to the step S55 when the discrimination result in the step S56 is NO. When the discrimination result in the step S56 is YES, a step S57 stops the motor 55 and the operation is ended.

In the second routine shown in FIG. 16, the step S11 carries out the fifth routine shown in FIG. 19A before advancing to the step S12 described before.

When the sixth routine is started in a step S60 in FIG. 19B, a step S61 rotates the motor 55 in the reverse direction so as to move the slider 51 in the direction C2. A step S62 discriminates whether or not the switch SW6 is ON. When the discrimination result in the step S62 becomes YES, a step S63 stops the motor 55 and the operation is ended.

Further, the present invention is not limited to these embodiments, but various variations and modifications may be made without departing from the scope of the present invention.

What is claimed is:

1. An information recording disc player for playing an information recording disc, said information recording disc player comprising: a main player body;
   a first receiving part in said main player body for receiving a first disc cartridge which can accommodate a plurality of information recording discs each put on a tray;
   a second receiving part in said main player body for receiving a second disc cartridge which can only accommodate a single information recording disc put on a tray, said first and second receiving parts being arranged so that the information recording discs accommodated within said first and second disc cartridges are arranged coaxially when said first and second disc cartridges are in said first and second receiving parts, respectively, said first and second receiving parts being open at first and second predetermined openings of a front panel of the main player body, respectively:
   means for ejecting said first disc cartridge from said first receiving part through said first predetermined opening of the front panel of the main player body;
   means for moving said second disc cartridge through said second predetermined opening of the front panel of the main player body between a disc receive/eject position, where said single information recording disc can be set into and removed from said second disc cartridge, and a loaded position within said second receiving part;
   a disc playing unit in said main player body for playing an information recording disc; and
   a mechanism for selectively loading an information recording disc on said disc playing unit from either one of said first and second disc cartridges in said first and second receiving parts and for unloading the information recording disc from said disc playing unit into the disc cartridge from which the information recording disc was originally loaded,
   said mechanism comprising a first mechanism for moving said disc playing unit in a first direction so that said disc playing unit confronts one information recording disc accomodated within one of said first and second disc cartridges in said first and second receiving parts, and a second mechanism including a slider for extracting said one information recording disc together with the tray from said one disc cartridge to be loaded on said disc playing unit and for inserting said one information recording disc together wit the tray unloaded from said disc playing unit into said one disc cartridge, said slider moving in a second direction perpendicular to said first direction, said second mechanism being mounted on said disc playing unit to be moved together with said disc playing unit by said first mechanism.

2. An information recording disc player as claimed in claim 1 in which said first and second receiving parts are arranged coaxially along an imaginary line perpendicular to a horizontal bottom plate of said main player body.

3. An information recording disc player as claimed in claim 1 in which said first and second receiving parts are arranged coaxially along an imaginary line parallel to a horizontal bottom plate of said main player body.

4. An information recording disc player as claimed in claim 1 in which said second disc cartridge is provided non-detachably on said main player body and slidable between a disc receive/eject position and a loaded position.

5. An information recording disc player as claimed in claim 1 in which said second disc cartridge is detachable with respect to said main player body.

6. An information recording disc player as claimed in claim 1 in which the trays in said first disc cartridge are identical to the tray in said second disc cartridge.

7. An information recording disc player as claimed in claim 1 which further comprises a third receiving part in said main player body for receiving another first disc cartridge which accommodates a plurality of information recording discs.

8. An information recording disc player as claimed in claim 7 in which said first, second and third receiving parts are arranged so that the information recording discs accommodated within said first, second and first disc cartridges are arranged coaxially when said first, second and first disc cartridges are in said first, third and second receiving parts, respectively.

* * * * *